April 25, 1939. P. F. DONAHUE 2,155,700
DISHER
Filed Feb. 3, 1938
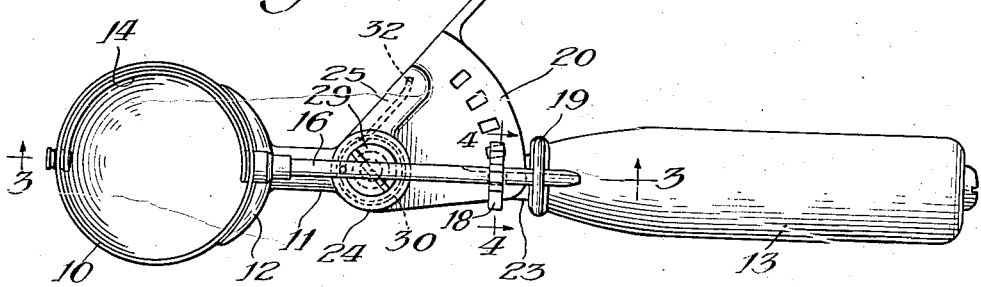
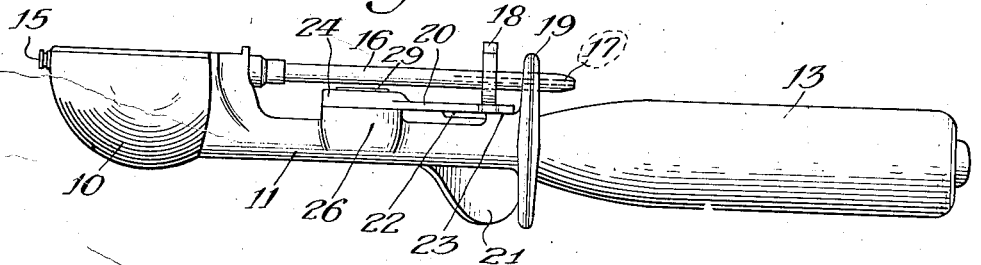
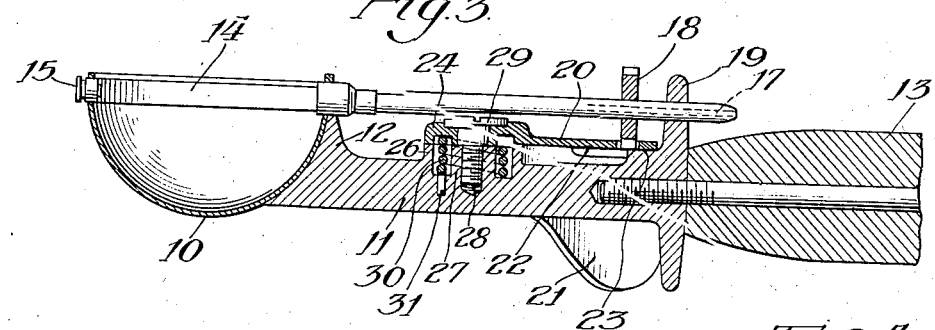
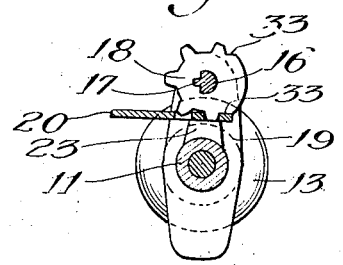
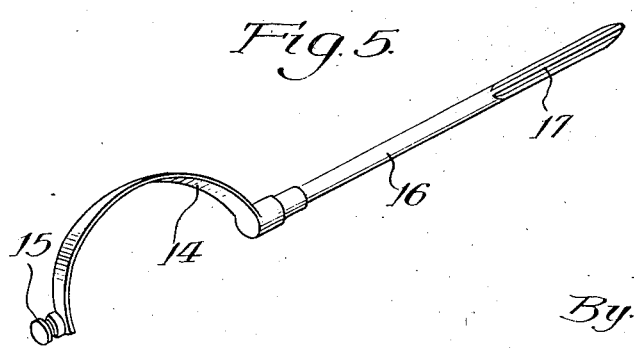
Inventor:
Patrick F. Donahue,
By Bertha L. MacGregor
Attorney.

Patented Apr. 25, 1939

2,155,700

UNITED STATES PATENT OFFICE 2,155,700

DISHER

Patrick F. Donahue, Waterville, Conn., assignor to Scovill Manufacturing Company, Waterbury, Conn., a corporation of Connecticut Application February 3, 1938, Serial No. 188,533

2 Claims. (Cl. 107—48)

This invention relates to dishers adapted for use in serving ice cream and other products.

One of the objects of the invention is to simplify the assembling of the several parts constituting the disher. Another object is to simplify and improve the construction of the means for connecting the thumb rack to the shank and for maintaining the rack under spring control. The advantages will appear from the following description.

In the drawing:

Fig. 1 is a plan view of a disher embodying my invention.

Fig. 2 is a side elevation of same.

Fig. 3 is a longitudinal section, enlarged, taken in the plane of the line 3—3 of Fig. 1.

Fig. 4 is an enlarged section on the line 4—4 of Fig. 1.

Fig. 5 is a perspective view of the scraper and scraper shaft detached from the disher.

As shown in the drawing, the disher comprises a hemispherical bowl 10, a metal shank 11 having an enlarged portion 12 soldered to the outer face of the bowl 10, and a handle 13 fixed to the free end of the shank.

A semi-circular resilient scraper 14 within the bowl 10 is provided with a trunnion 15 which fits within a bearing in the bowl 10. The scraper is integral with a scraper shaft 16, having a spline 17, on which is mounted a gear wheel 18. The rear wheel is thus made to rotate with the shaft 16, but is capable of relative movement longitudinally of the splined shaft. The shaft 16 is rotatably mounted in the enlarged portion 12 of the shank and in a bearing formed by an upward extension 19 on the shank 11.

An arcuate rack 20 is aperture or indented adjacent its curved edge, and is formed integrally with a lever 21 which is at a right angle to the surface of the rack. The rack is flat throughout the major portion of its area, as will be seen in Figs. 2 and 3, with its lower surface 22 resting on and movable over a flat bearing surface 23 formed on the shank 11 adjacent the extension 19. The metal of which the rack 20 is made is pressed or otherwise formed to provide an apertured bearing 24 and a spring retaining shoulder 25, lying in a plane slightly above the rest of the rack surface.

A well or socket 26, formed in the shank 11, has a bearing stud 27 rising from its central portion. The stud 27 is internally screw threaded. The apertured portion 24 of the rack 20 bears on the flat edge surfaces of the well 26 and stud 27 and is pivotally mounted on the well portion of the shank by a screw 28 which fits in the bearing stud 27 and has a head 29 countersunk in the bearing portion 24 of the rack. A spring 30 is coiled around the stud 27 in the well and has one end 31 engaged in the base of the well and its other end 32 bearing against the lever 21, beneath the part 25 of the rack, serving to retract the rack and normally hold it in the position shown in Fig. 1.

The gear wheel 18 has teeth equal in number to the apertures or indentations in the arcuate rack 20, said teeth occupying part of the periphery, and the shoulders 33, adjacent the end teeth, serve as stops for bearing on the rack and limiting its pivotal movement in opposite directions.

Heretofore the assembling of the scraper, scraper shaft and gear wheel and mounting of the shaft in its bearings on the shank have presented some difficulties which necessitated making the scraper and shaft non-integral or extending one of the rack apertures to the edge of the rack so that the gear wheel could be engaged with the rack. By employing a splined shaft in the combination disclosed, I am able to make the scraper and shaft integral and easily assemble them with the rest of the device, including a rack having apertures or indentations of uniform size. The shaft 16 is inserted through the bearing 12, from the cup side, the gear wheel 18 is held in engagement with the rack, the splined end 17 passed through the wheel and into the bearing extension 19, and the scraper 14 is sprung into position in the bowl, with the trunnion 15 engaging the apertured wall as shown.

Another advantage lies in the means for attaching the rack to the shank. By providing a screw threaded stud 27 for engaging the screw 28 having its flat head 29 bearing on the rack portion 24 and closing the only opening to the socket or well 26, I efficiently protect the socket from moisture, firmly hold the rack down on the shank, and avoid the use of a washer and split key or other protruding fastening devices heretofore used for fastening the rack to the shank, and also avoid the use of non-positive fastening means which under pressure permitted the rack to become loosened and to bear against the scraper shaft.

The lever 21 on rack 20 is intended to be thumb operated by a person holding the handle 13, for actuating the scraper 14 in the bowl 10.

Changes may be made in form and details of construction without departing from the scope of my invention. Wherever the rack apertures for engagement with the gear teeth are referred to, I intend also to include indentations which serve the same purpose.

I claim:

1. A disher comprising a bowl, a shank and a handle rigidly connected together, an upward extension on the shank adjacent the handle, a socket having a single opening formed in the shank, a raised bearing surface on the shank between the socket and the upward extension, an arcuate, substantially flat rack having an apertured end adapted to seat on said socket wall and having an apertured edge portion bearing on said flat bearing surface, a screw extending through the apertured rack into the socket, connecting the rack to the shank and closing the socket and the opening in the rack, a scraper shaft connected to the scraper and rotatably mounted in said extension on the shank, said rack and screw connection being located between the scraper shaft and the shank, and a gear on the shaft engaging the rack.

2. A disher comprising a bowl, a shank and a handle rigidly connected together, an upward extension on the shank adjacent the handle, a socket having a single opening formed in the shank, a raised bearing surface on the shank between the socket and the upward extension, an arcuate, substantially flat rack having an apertured end adapted to seat on said socket wall and having an apertured edge portion bearing on said flat bearing surface, a screw extending through the apertured rack into the socket, connecting the rack to the shank and closing the socket and the opening in the rack, a spring in the socket having one end engaging the under side of the rack between the rack and the shank, a scraper shaft connected to the scraper and rotatably mounted in said extension on the shank, said rack and screw connection being located between the scraper shaft and the shank, and a gear on the shaft engaging the rack.

PATRICK F. DONAHUE.